United States Patent [19]
Liao

[11] Patent Number: 5,315,082
[45] Date of Patent: May 24, 1994

[54] DEPRESSIBLY-ACTUATED SWITCH MEANS FOR NORMALLY DISCONNECTING POWER SOURCE OF INTEGRATED CIRCUIT

[76] Inventor: Fu-Chiang Liao, c/o Hung Hsing Patent Service Center, P.O. Box 55-1670, Taipei (10477), Taiwan

[21] Appl. No.: 20,419

[22] Filed: Feb. 22, 1993

[51] Int. Cl.$^5$ .............................................. H02J 7/00
[52] U.S. Cl. ................................... 200/506; 200/61.19
[58] Field of Search ............... 200/506, 61.19; 320/29, 320/54, 55

[56] References Cited

U.S. PATENT DOCUMENTS

| | | | |
|---|---|---|---|
| 2,021,041 | 11/1935 | Altamura | 200/506 |
| 4,617,561 | 10/1986 | Brown | 200/61.19 |
| 4,697,133 | 9/1987 | Pergandis | 320/2 |
| 4,939,326 | 7/1990 | Weinblatt | 200/506 |

Primary Examiner—Renee S. Luebke

[57] ABSTRACT

A switch of an integrated circuit includes: a housing wherein a plurality of cells connected in series are stored in a battery chamber formed in the housing, and an integrated circuit formed on a board mounted in the housing electrically connected to a power source comprised of the cells. An insulating barrier is normally inserted in between any two neighboring cells for disconnecting the power conducted through the cells for preventing power loss. An upper cover is resiliently held above the housing for shielding the housing having an actuating pawl normally engageable with a ratchet tooth formed on the insulating barrier. Upon depression of the upper cover to allow the pawl to pivotally raise and remove the barrier from the two neighboring cells for electrically connecting the cells, the power supply to the integrated circuit operatively actuates the integrated circuit such as for sounding purposes.

8 Claims, 3 Drawing Sheets

DEPRESSIBLY-ACTUATED SWITCH MEANS FOR NORMALLY DISCONNECTING POWER SOURCE OF INTEGRATED CIRCUIT

BACKGROUND OF THE INVENTION

A conventional integrated circuit includes a plurality of batteries C such as button-type cells connected in series and stored in a bottom chamber shielded by a bottom cover B in a housing H as shown in FIG. 5 for powering the integrated circuit (not shown) in the housing. An electrically insulating plate I may be inserted through a slot S formed in the bottom cover B in between any two neighboring cells for normally switching off the power connection through the cells for preventing the consumption of electrical energy by the components of the integrated circuit. Even though the electrical energy normally consumed by the integrated circuit is small, an accumulated power consumption, such as caused by a shipping period or when kept in a show room for a long time during handling or storage, may still exhaust the power.

However, the insulating plate I inserted in between the cells C may be easily missing or loosened, thereby losing its normal power-disconnection effect. Also, upon installing the integrated circuit into a stuffing toy, the integrated circuit with its housing H may be sewn into the stuffing of the toy and the insulating plate I should be removed before putting the integrated circuit into the toy, thereby still causing power consumption of the cells stored in the integrated circuit housing especially when shipped, handled or displayed for a long time period and possibly producing no sound from the integrated circuit once the power is exhausted.

SUMMARY OF THE INVENTION

The object of the present invention is to provide a switch including: a housing having a plurality of cells connected in series and stored in a battery chamber formed in the housing, an integrated circuit formed on a board mounted in the housing electrically connected to a power source comprised of the cells, an insulating barrier normally inserted in between any two neighboring cells for disconnecting the power conducted through the cells for preventing power loss normally, and an upper cover resiliently held above the housing for shielding the housing having an actuating pawl normally engageable with plural ratchet teeth formed on the insulating barrier, whereby upon depression of the upper cover to actuate the barrier, the barrier will be biased and removed from the inserting cells for recovering a power connection through the cells for a power supply to the integrated circuit for operatively actuating the integrated circuit such as for sounding purpose.

DETAILED DESCRIPTION

Figure 1:
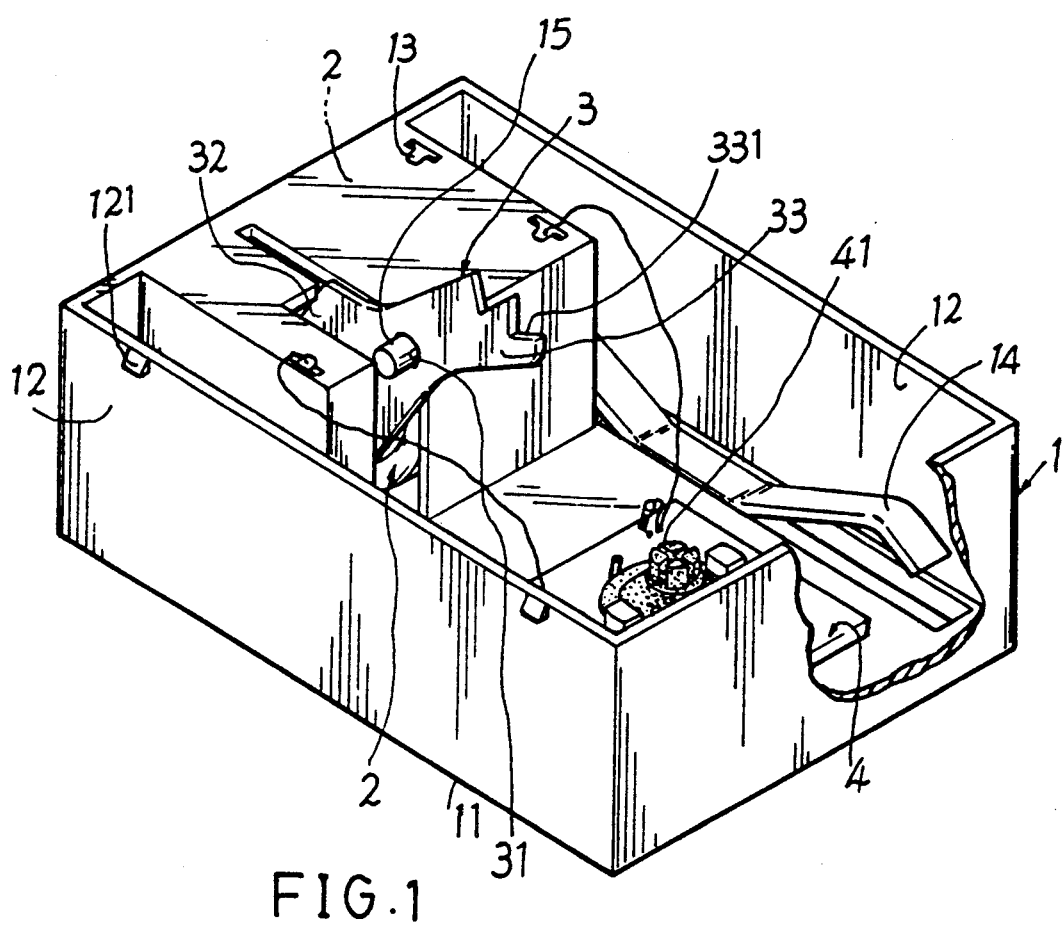
FIG. 1 is a perspective view of the housing of the present invention.
Figure 2:
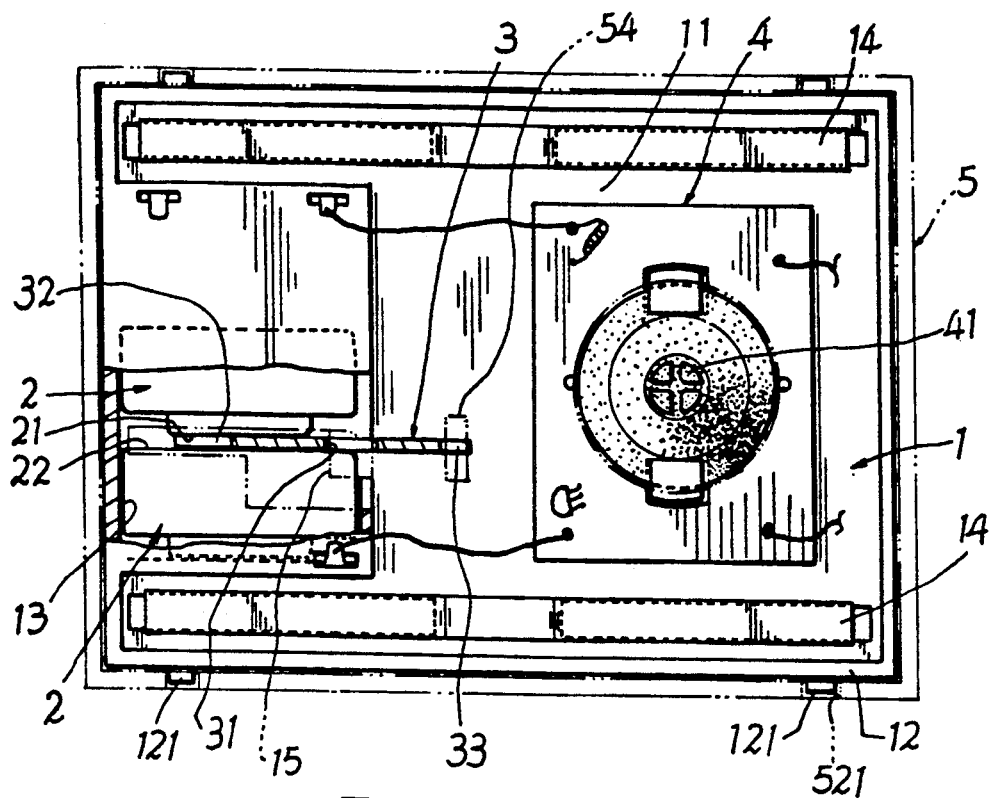
FIG. 2 is a top view illustration of the housing of the present invention.
Figure 3:
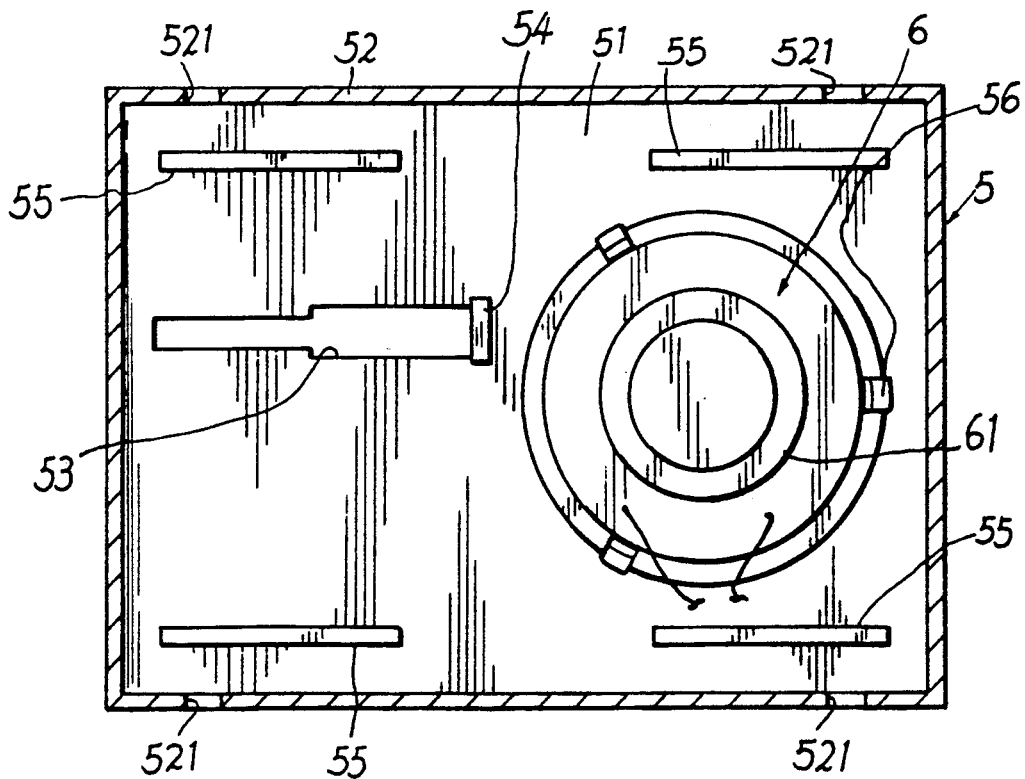
FIG. 3 is an illustration showing the upper cover of the present invention.
Figure 5:
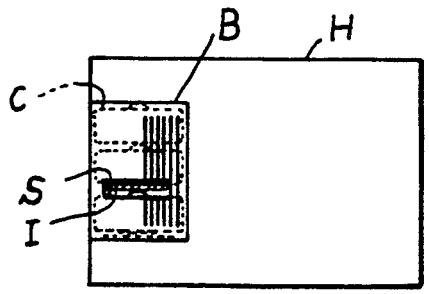
FIG. 5 is a bottom view of a conventional integrated circuit housing.
Figure 4:
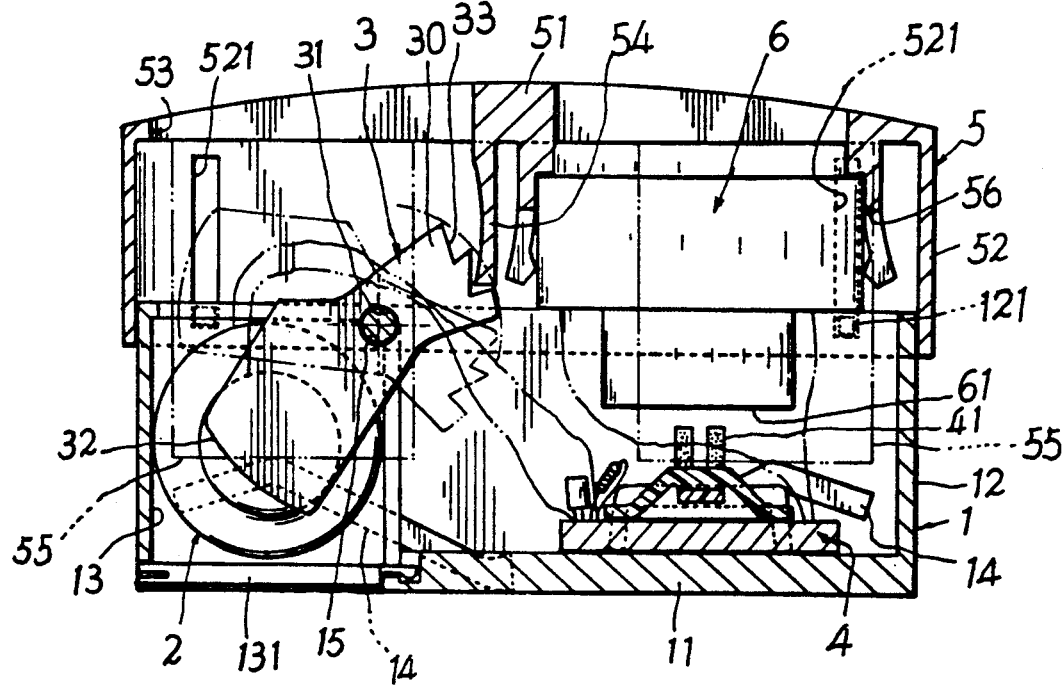
FIG. 4 is a sectional drawing of the present invention when assembled.

As shown in FIGS. 1-4, the present invention comprises: a housing 1, a plurality of batteries 2 connected in series and stored in the housing 1, an electrically insulating barrier 3 inserted between any two neighboring batteries 2, an integrated circuit 4 such as a sounding integrated circuit formed on a board secured in the housing 1, and an upper cover 5 having a buzzer or speaker 6 mounted on the upper cover 5 for assembling a switch means in accordance with the present invention.

The housing 1 includes: a bottom plate 11, a plurality of lower side walls 12 circumferentially formed on all side edge portions around the bottom plate 11, a battery chamber 13 formed in a bottom portion in the housing 1 for storing the batteries 2 in the battery chamber 13, a plurality of spring members 14 integrally formed on the bottom plate 11, and a pivot 15 formed on an upper portion of the battery chamber 13.

Each battery of the plurality of batteries 2 may be selected from a button cell having a positive pole 21 and a negative pole 22 connected in series and stored in the battery chamber 13 in the housing 1 to be shielded by a battery cover 131 detachably formed in the bottom plate 11 of the housing 1.

The electrically insulating barrier 3 includes: a lever plate 30 made of electrically insulating materials, a pivot hole 31 formed in a central portion of the lever plate 30 engageable with the pivot 15 formed in the housing 1 for pivotably mounting the lever plate 30 of the insulating barrier 3 in the housing 1, a shielding plate portion 32 formed on an inner portion of the lever plate 30 for normally partitioning any two neighboring batteries 2 originally connected in series and stored in the housing 1, whereby upon removal of the shielding plate portion 32 from the two neighboring batteries 2, the two batteries will then be electrically connected, and a depression portion 33 formed on an outer portion of the lever plate 30 opposite to the shielding portion 32 to be operatively depressed downwardly by the upper cover 5 for biasing the shielding portion 32 upwardly for connecting the two batteries for conducting an electrical current through said two batteries 2.

The depression portion 33 of the insulating barrier 3 is formed with a plurality of ratchet teeth 331, such as the three teeth as shown in the drawings. The teeth are serratedly formed on an outer edge portion of the depression portion 33 of the lever plate 30 of the insulating barrier 3.

The upper cover 5 includes: an upper plate 51, a plurality of upper side walls 52 circumferentially formed on all side edge portions around the upper plate 51 engageable with the plurality of lower side walls 12 of the housing 1 for shielding the housing 1, an actuating pawl 54 protruding downwardly from the upper plate 51 for operatively actuating the depression portion 33 of the insulating barrier 3 for recovering a power connection between the two neighboring batteries 2 previously inserted and insulated by the barrier 3, and a plurality of spring-depressing members 55 protruding downwardly from the upper plate 51 for compressing the plurality of spring members 14 formed in the housing 1 for restoring the upper cover 5 upwardly after being depressed downwardly for connecting the power and for triggering the integrated circuit 4 mounted in the housing 1.

The upper cover 5 includes a buzzer holder 56 for holding a buzzer or speaker 6 under the upper plate 51, with the buzzer 6 electrically connected to the integrated circuit 4 in the housing 1, whereby upon depression of the upper cover 5 towards the housing 1 to connect the batteries for powering the integrated circuit 4 in the housing 1, a trigger switch 41 of the integrated circuit 4 will be actuated by the upper cover 5.

The buzzer bottom 61 of buzzer 6 held on the upper cover 5 will operatively actuate the trigger switch 41 of a sounding integrated circuit 4 for sounding the buzzer 6 upon downward depression of the upper cover 5 onto the housing 1.

The actuating pawl 54 of the upper cover 5 operatively depresses a ratchet tooth 331 formed on the depression portion 33 of the insulating barrier 3 for pivotally raising the shielding portion 32 of the barrier 3 upwardly about the pivot 15 to conduct the batteries 2 for powering the integrated circuit 4 for operating the integrated circuit 4.

The lower side walls 12 of the housing 1 are formed with a plurality of protrusions 121. Each protrusion 121 is slidably engageable with a reciprocating slot 521 longitudinally formed in the upper side wall 52 of the upper cover 5 for limiting an upward movement of the upper cover 5 from the housing 1 and for guiding the reciprocative movement of the upper cover 5 resiliently retained above or on the housing 1.

The upper plate 51 of the upper cover 5 is formed with a reset slot 53 so that a tool (any tool which is not limited) may be poked into the housing 1 through the re-set slot 53 for depressing the shielding portion 32 of the insulating barrier 3 downwardly for resetting a normal switch-off position of the batteries when the insulating barrier 3 is accidentally, falsely or unexpectedly depressed, such as by a laborer in a factory while the pawl 54 is disengaged from the ratchet teeth 331 of the barrier 3.

Since the insulating barrier 3 normally separates any two neighboring cells or batteries 2 to disconnect their power supply without causing unexpected consumption of electrical energy, the switch means of an integrated circuit (I.C.) such as a sounding I.C. can be safely handled, transported, stored or displayed for a long time without worrying about exhausting its power.

When using the switch means of this invention, such as for sensing a stuffing toy installed with such a switch means, the upper cover 5 may be depressed to actuate the depression portion 33 of the barrier 3 downwardly in order to move the shielding portion 32 upwardly to recover the power supply from the batteries 2 and to trigger the switch 41, simultaneously also be triggered for operating the I.C. for its amusing sounding or other display purposes.

I claim:

1. An electrical device comprising:
   a housing;
   a power source comprised of a plurality of neighboring batteries connected in series and located in the housing;
   an integrated circuit mounted in said housing and powered by said batteries; and
   a switch means comprising an electrically insulating barrier operatively attached to said housing and insertable between two neighboring batteries of said plurality of batteries for interrupting power through said batteries and said integrated circuit and further preventing power consumption by said integrated circuit, and an upper cover resiliently mounted on said housing for shielding said housing and operatively moving said insulating barrier from between said neighboring batteries, whereby when said cover is depressed, said insulating barrier moves from between the neighboring batteries to a position allowing a completed electrical circuit between said power source and said integrated circuit, thereby powering said integrated circuit.

2. An electrical device according to claim 1, wherein said electrically insulating barrier includes: a lever plate made of electrically insulating materials, a pivot hole formed in a central portion of the lever plate engageable with a pivot formed in the housing for pivotably mounting the lever plate of the insulating barrier in the housing, a shielding plate portion formed on an inner portion of the lever plate for normally partitioning any two said neighboring batteries originally connected in series and stored in the housing, whereby upon removal of said shielding plate portion from the two neighboring batteries, the two said batteries will be electrically connected, and a depression portion formed on an outer portion of the lever plate opposite to the shielding portion to be operatively depressed downwardly by said upper cover for pivotally raising the shielding portion upwardly for connecting the two said batteries for conducting an electrical current through said two batteries.

3. An electrical device according to claim 2, wherein said depression portion of the electrically insulating barrier is formed with a plurality of serrated ratchet teeth on an outer edge portion of the depression portion of the lever plate of the insulating barrier.

4. An electrical device according to claim 1, wherein said housing includes: a bottom plate, a plurality of lower side walls circumferentially formed on all side edge portions around the bottom plate, a battery chamber formed in a bottom portion in the housing for storing the plurality of batteries in the battery chamber, a plurality of spring members integrally formed on the bottom plate, and a pivot formed on an upper portion of the battery chamber for pivotably mounting said electrically insulating barrier.

5. An electrical device according to claim 4, wherein said plurality of batteries are selected from a plurality of button cells, each said cell having a positive pole and a negative pole, connected in series and stored in the battery chamber in the housing to be shielded by a battery cover detachably formed in the bottom plate of the housing.

6. An electrical device according to claim 4, wherein said upper cover includes: an upper plate, a plurality of upper side walls circumferentially formed on all side edge portions around the upper plate engageable with the plurality of the lower side walls of the housing for shielding the housing, an actuating pawl protruding downwardly from the upper plate for operatively actuating a depression portion of the insulating barrier for recovering a power connection between the two neighboring batteries previously inserted and insulated by the barrier, and a plurality of spring-depressing members protruding downwardly from the upper plate for compressing the plurality of spring members formed in the housing for restoring the upper cover upwardly after being depressed downwardly for connecting the power and for triggering the integrated circuit mounted in the housing.

7. An electrical device according to claim 6, wherein said upper cover includes said actuating pawl operatively depressing a ratchet tooth formed on the depression portion of the insulating barrier for pivotally raising the shielding portion of the barrier to connect the batteries for powering the integrated circuit for operating the integrated circuit.

8. An electrical device according to claim 6, wherein said upper plate of the upper cover is formed with a re-set slot, allowing insertion of a tool into the housing through the re-set slot for resetting said barrier to a normal switch-off condition of said batteries when previously accidentally shifted to a switch-on position.

* * * * *